United States Patent
Dadheech et al.

(10) Patent No.: US 9,520,600 B2
(45) Date of Patent: Dec. 13, 2016

(54) CONDUCTIVE AND HYDROPHILIC BIPOLAR PLATE COATINGS AND METHOD OF MAKING THE SAME

(75) Inventors: Gayatri Vyas Dadheech, Rochester Hills, MI (US); Michael J. Lukitsch, Marysville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 2017 days.

(21) Appl. No.: 12/564,344

(22) Filed: Sep. 22, 2009

(65) Prior Publication Data

US 2011/0070529 A1    Mar. 24, 2011

(51) Int. Cl.
*H01M 8/02* (2016.01)
*H01M 8/10* (2016.01)

(52) U.S. Cl.
CPC ... *H01M 8/0228* (2013.01); *H01M 2008/1095* (2013.01); *Y02E 60/50* (2013.01); *Y02P 70/56* (2015.11)

(58) Field of Classification Search
CPC ............... H01M 8/0228; H01M 2008/1095; Y02P 70/56; Y02E 60/50
USPC .................................................. 429/456–457
See application file for complete search history.

(56) References Cited

U.S. PATENT DOCUMENTS

| | | | |
|---|---|---|---|
| 5,952,060 A | 9/1999 | Ravi | |
| 6,291,094 B1 * | 9/2001 | Yoshimura et al. | 429/492 |
| 6,660,424 B1 * | 12/2003 | Gyoten et al. | 429/457 |
| 6,726,993 B2 | 4/2004 | Teer et al. | |
| 7,709,145 B2 | 5/2010 | Abd Elhamid et al. | |
| 2003/0194594 A1 | 10/2003 | Nakajima et al. | |
| 2004/0005502 A1 | 1/2004 | Schlag | |
| 2004/0091768 A1 * | 5/2004 | Abd Elhamid et al. | 429/42 |
| 2004/0157108 A1 | 8/2004 | Blunk et al. | |
| 2005/0008919 A1 | 1/2005 | Extrand | |
| 2005/0100774 A1 | 5/2005 | Abd Elhamid et al. | |
| 2005/0233203 A1 | 10/2005 | Hampden-Smith et al. | |
| 2006/0105222 A1 | 5/2006 | Abd Elhamid et al. | |
| 2006/0147781 A1 | 7/2006 | Cai et al. | |
| 2006/0147796 A1 | 7/2006 | Miura et al. | |
| 2006/0194095 A1 * | 8/2006 | Vyas et al. | 429/38 |
| 2006/0257711 A1 | 11/2006 | Abd Elhamid et al. | |
| 2007/0003815 A1 | 1/2007 | Vyas et al. | |
| 2007/0037036 A1 | 2/2007 | Winter et al. | |
| 2007/0087257 A1 * | 4/2007 | Son et al. | 429/38 |
| 2007/0125988 A1 | 6/2007 | Howard | |
| 2007/0141238 A1 | 6/2007 | Angelopoulos et al. | |
| 2007/0178356 A1 | 8/2007 | Newman et al. | |

(Continued)

FOREIGN PATENT DOCUMENTS

| CN | 1557990 A | 12/2004 |
|---|---|---|
| CN | 101248551 A | 8/2008 |
| WO | 2008/075812 A1 | 6/2008 |

*Primary Examiner* — Milton I Cano
*Assistant Examiner* — Stephen Yanchuk
(74) *Attorney, Agent, or Firm* — Brooks Kushman P.C.

(57) ABSTRACT

A flow field plate for fuel cell applications includes a metal with a carbon layer disposed over at least a portion of the metal plate. The carbon layer is overcoated with a titanium oxide layer to form a titanium oxide/carbon bilayer. The titanium oxide/carbon bilayer may be activated to increase hydrophilicity. The flow field plate is included in a fuel cell with a minimal increase in contact resistance. Methods for forming the flow field plates are also provided.

14 Claims, 6 Drawing Sheets

(56) References Cited

U.S. PATENT DOCUMENTS

| | | |
|---|---|---|
| 2007/0178357 A1* | 8/2007 | Vyas et al. .................. 429/38 |
| 2007/0178365 A1* | 8/2007 | Sugimasa et al. ............ 429/44 |
| 2008/0044715 A1 | 2/2008 | Vyas et al. |
| 2008/0102347 A1 | 5/2008 | Blunk |
| 2009/0011310 A1 | 1/2009 | Trabold et al. |
| 2009/0087716 A1 | 4/2009 | Abd Elhamid et al. |

* cited by examiner

CONDUCTIVE AND HYDROPHILIC BIPOLAR PLATE COATINGS AND METHOD OF MAKING THE SAME

CROSS-REFERENCE TO RELATED APPLICATIONS

This application is related to co-pending U.S. application Ser. NO. 12/564,339, filed Sep. 22, 2009, the entire disclosure of which is hereby incorporated by reference.

BACKGROUND OF THE INVENTION

1. Field of the Invention

The present invention relates generally to an electrically conductive fluid distribution plate, a method of making an electrically conductive fluid distribution plate, and systems using an electrically conductive fluid distribution plate according to the present invention. More specifically, the present invention is related to the use of an electrically conductive fluid distribution plate in addressing contact resistance difficulties in fuel cells and other types of devices.

2. Background Art

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

In general, bipolar plates for fuel cell applications need to be corrosion resistant, electrically conductive, and have a low contact angle for effective water management. Metals such as stainless steel are typically used for bipolar plates because of their mechanical strength and ability to be stamped. However, such metals often have a passive oxide film on their surfaces requiring electrically conductive coatings to minimize the contact resistance. Such electrically conductive coatings include gold and polymeric carbon coatings. Typically, these coatings require expensive equipment that adds to the cost of the finished bipolar plate. Moreover, metallic bipolar plates are also subject to corrosion during operation. The degradation mechanism includes the release of fluoride ions from the polymeric electrolyte. Metal dissolution of the bipolar plates typically results in release of iron, chromium and nickel ions in various oxidation states.

For water management, it is desirable for metal bipolar plates to have a low contact angle at the bipolar plate/water border; that is, a contact angle less than 40°. Titanium nitride coatings have been proposed as corrosion-resistant plating for bipolar plates. Although titanium nitride coatings are cost-effective, such coatings do not provide satisfactory protection for the bipolar plate material. Further, titanium nitride coatings develop relatively low water affinity with a contact angle close to 60°.

Accordingly, there is a need for improved methodology for lowering the contact resistance at the surfaces of bipolar plates used in fuel cell applications.

SUMMARY OF THE INVENTION

The present invention solves one or more problems of the prior art by providing in at least one embodiment a flow field plate for use in a fuel cell. The flow field plate of this embodiment comprises a metal plate having a first surface and a second surface. The first surface defines a plurality of channels for directing flow of a first gaseous composition. A carbon layer is disposed over at least a portion of the metal plate while a titanium oxide layer is disposed over at least a portion of the carbon layer to form a titanium oxide-coated carbon bilayer.

In at least one embodiment, the titanium oxide-coated carbon bilayer has a surface with a contact angle less than about 30 degrees and a contact resistance of less than 40 mohm-cm$^2$ when the flow field plate is sandwiched between carbon papers at 200 psi.

In another embodiment, a fuel cell incorporating the flow field plate set forth above is provided. The fuel cell includes a first flow field plate with a titanium oxide-coated carbon bilayer. A first catalyst layer is disposed over the first flow field plate. An ion conductor layer is disposed over the first flow field plate and a second catalyst layer over the ion conductor layer. Finally, a second flow field plate is disposed over the second catalyst layer. Gas diffusion layers are provided as needed.

In still another embodiment, a method for forming the flow field plate set forth above is provided. The method comprises depositing a carbon layer on a metallic plate followed by deposition of a titanium oxide layer over the carbon layer to form a titanium oxide-coated carbon bilayer.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Figure 1A:
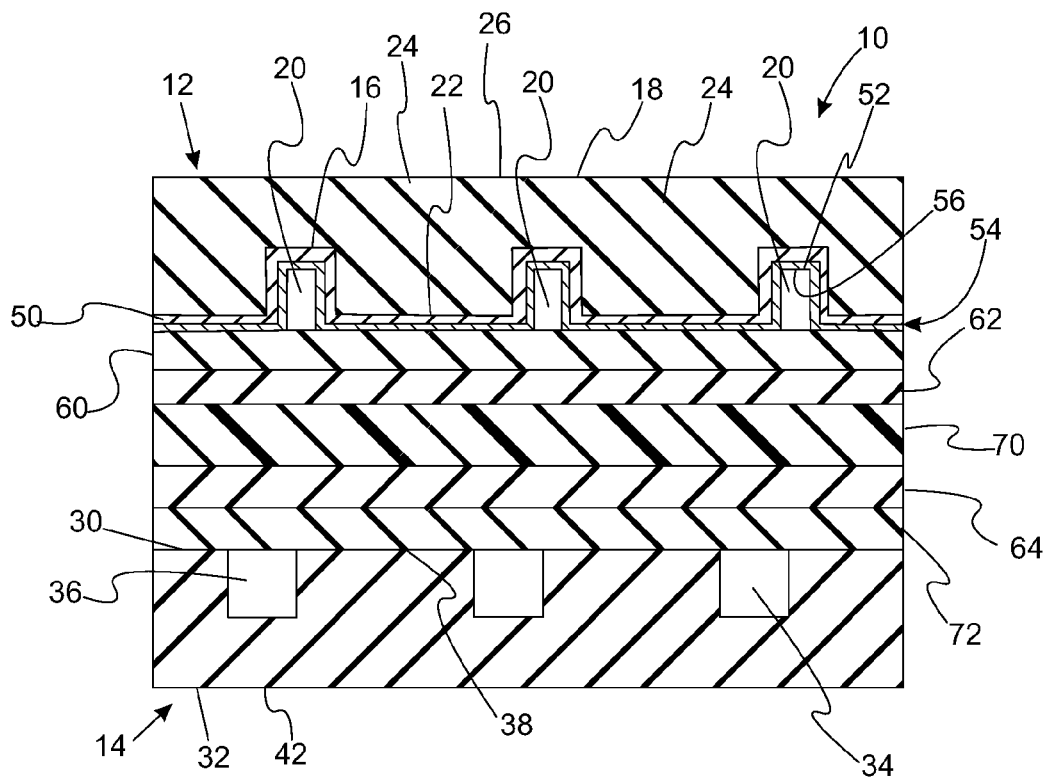
FIG. 1A provides a cross sectional view of a fuel cell incorporating an exemplary embodiment of a titanium oxide/carbon bilayer on a unipolar plate.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application where publications are referenced, the disclosures of these publications in their entireties are hereby incorporated by reference into this application to more fully describe the state of the art to which this invention pertains.

The terms "roughness average" or "surface roughness average" as used herein means arithmetic average of the absolute values of the profile height deviations. The roughness average may be determined in accordance with ANSI B46.1. The entire disclosure of this reference is hereby incorporated by reference.

In an embodiment of the present invention, a flow field plate for use in fuel cell applications is provided. The flow field plate of this embodiment comprises a metal plate with a titanium oxide-coated carbon bilayer disposed over at least a portion of the metal plate. The titanium oxide-coated carbon bilayer has a surface with a contact angle less than about 30 degrees and a contact resistance of less than 40 mohm-cm$^2$ when the flow field plate is sandwiched between carbon papers at 200 psi. The present embodiment encompasses both unipolar and bipolar plates.

Figure 1B:
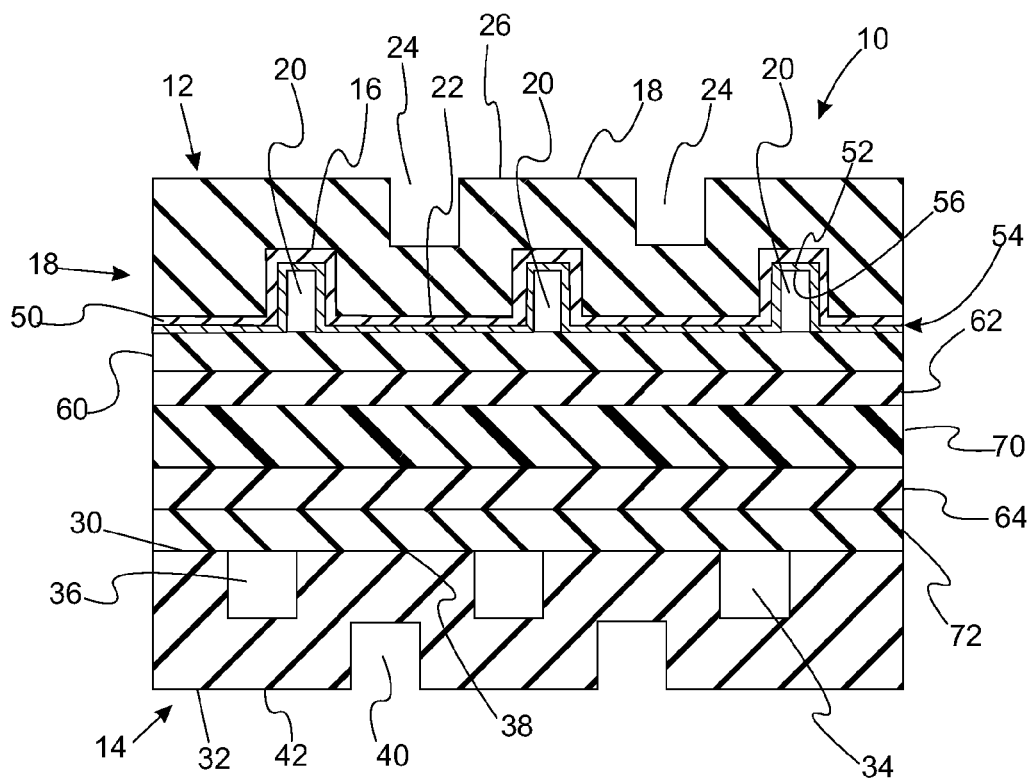
FIG. 1B provides a cross sectional view of a fuel cell incorporating an exemplary embodiment of a titanium oxide/carbon bilayer on a bipolar plate.

With reference to FIGS. 1A and 1B, a schematic cross section of fuel cells incorporating the flow field plates of this embodiment is provided. Fuel cell 10 includes flow field plates 12, 14. Typically, flow field plates 12, 14 are made from a metal such as stainless steel. Flow field plate 12 includes surface 16 and surface 18. Surface 16 defines channels 20 and lands 22. FIG. 1A provides a depiction in which flow field plate 12 is a unipolar plate. FIG. 1B provides a depiction in which flow field plate 12 is a bipolar plate. In this variation, surface 18 defines channels 24 and lands 26. Similarly, flow field 14 includes surface 30 and surface 32. Surface 30 defines channels 36 and lands 38. FIG. 1A provides a depiction in which flow field plate 14 is a unipolar plate. FIG. 1B provides a depiction in which surface 32 defines channels 40 and lands 42.

Still referring to FIGS. 1A and 1B, carbon layer 50 is disposed over and contacts surface 16. Titanium oxide layer 52 is disposed over carbon layer 50 to form titanium oxide/carbon bilayer 54. Carbon layer 50 may be amorphous, crystalline, or a combination thereof. Typically, the combined thickness of titanium oxide/carbon bilayer 54 is less than 200 nm. In another refinement, the combined thickness of titanium oxide/carbon bilayer 54 is less than 100 nm. In still another variation, the combined thickness of titanium oxide/carbon bilayer 54 is greater than about 10 nm. In yet another refinement, the combined thickness of titanium oxide/carbon bilayer 54 is greater than about 30 nm. In yet another variation, the combined thickness of titanium oxide/carbon bilayer 54 is from about 20 nm to about 80 nm. In a variation, titanium oxide/carbon bilayer 54 includes surface 56 having a contact angle less than about 40 degrees. The present embodiment is distinguished from the prior art methods that use hydrocarbon-containing silane coupling agents to produce hydrophilic coatings in that the titanium oxide layer includes hydrocarbons in an amount that is less than about 40 weight percent of the total weight of the titanium oxide layer. In another refinement, the titanium oxide layer includes hydrocarbons in an amount that is less than about 20 weight percent of the total weight of the titanium oxide layer. In still another refinement, the titanium oxide layer includes hydrocarbons in an amount that is less than about 10 weight percent of the total weight of the titanium oxide layer. In yet another refinement, the titanium oxide layer includes hydrocarbons in an amount that is less than about 50 weight percent of the total weight of the titanium oxide layer. In this context, the term "hydrocarbons" refers to any moiety having a carbon hydrogen bond.

In a variation of the present embodiment, titanium oxide/carbon bilayer 54 is only deposited on the walls of the channels and not on the lands. In another variation, the titanium layer is only deposited on the walls of the channels while the carbon layer may be deposited on the lands.

Still referring to FIGS. 1A and 1B, fuel cell 10 further includes gas diffusion layer 60 and catalyst layers 62, 64. Polymeric ion conductive membrane 70 is interposed between catalyst layers 62, 64. Finally, fuel cell 10 also includes gas diffusion layer 72 positioned between catalyst layer 64 and flow field plate 14.

In a variation of the present invention, a first gas is introduced into channels 20 and a second gas is introduced into channels 36. Channels 20 direct the flow of the first gas and channels 36 direct the flow of the second gas. In a typical fuel cell application, an oxygen-containing gas is introduced into channels 20 and a fuel is introduced into channels 36. Examples of useful oxygen containing gases include molecular oxygen (e.g., air). Examples of useful fuels include, but are not limited to, hydrogen. When an oxygen-containing gas is introduced into channels 20, water is usually produced as a by-product, which must be removed via channels 20. In this variation, catalyst layer 62 is a cathode catalyst layer and catalyst layer 64 is an anode catalyst layer.

Figure 2:
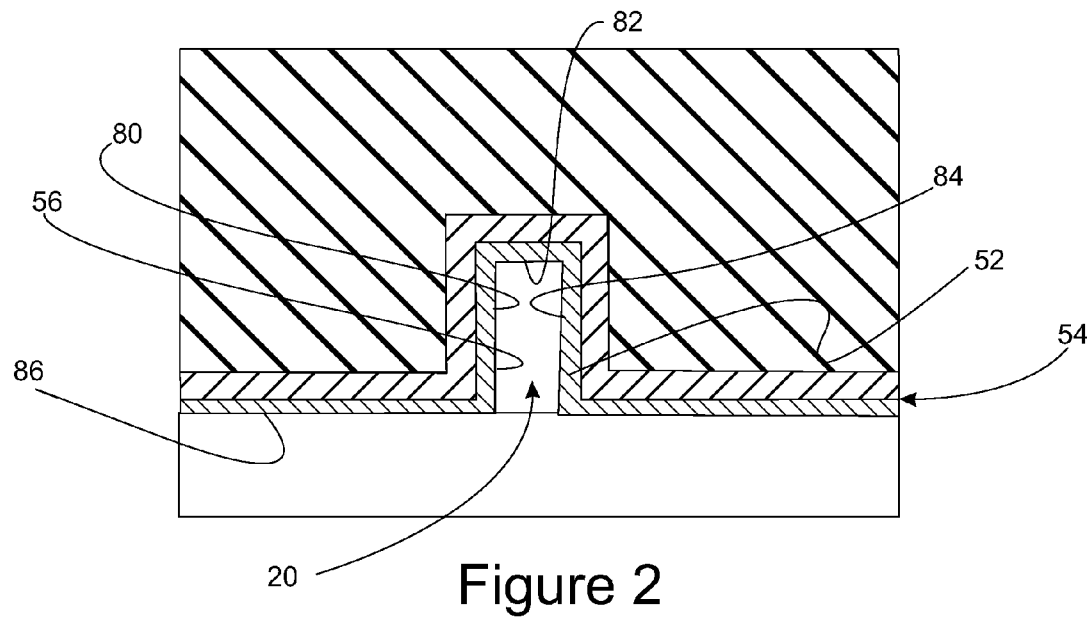
FIG. 2 provides a cross sectional view of a bipolar plate channel coated with a titanium oxide/carbon bilayer.

With reference to FIG. 2, a magnified cross sectional view of channel 20 is provided. Surfaces 80, 82, 84 of titanium oxide layer/carbon bilayer 54 provide exposed surfaces in channel 20. Advantageously, these surfaces of titanium oxide layer/carbon bilayer 54 are hydrophilic, having a contact angle less than about 40 degrees. In another refinement, the contact angle is less than about 30 degrees. In still another refinement, the contact angle is less than about 20 degrees. In yet another refinement, the contact angle is less than about 10 degrees. The hydrophilic nature of titanium oxide layer/carbon bilayer 54 prevents water from agglomerating in channels 20. In a refinement of the present embodiment, the hydrophilicity of titanium oxide layer/carbon bilayer 54 is improved by activating surface 56 (i.e., surfaces 80, 82, 84, 86). In a variation of the present embodiment, the surface is activated by a ultraviolet (UV) or plasma (e.g., RF plasma, DC plasma, microwave plasma, hot filament plasma, open air plasma, and the like). In one refinement, the activation is accomplished by exposing titanium oxide layer/carbon bilayer 54 to a UV source where the low band gap of titanium oxide 3 to 3.2 eV absorbs UV radiation and causes electrons to jump into the conduction band creating positive holes in valence bands. This known photocatalytic ability of titanium oxide under UV activation makes it capable of not only keeping the surface hydrophilic but also oxidizing organic residues and keeping surfaces permanently clean. Accordingly, such layers are hydrolytically stable under typical fuel cell operating conditions.

In another refinement, the post treatment is accomplished by exposing the titanium oxide/carbon bilayer to reactive gases such as nitrogen, nitrous oxide, nitrogen dioxide, ammonia or mixtures thereof, which activate the titanium oxide layer/carbon bilayer by breaking bonds and forming nitrogen-based derivatives like amines, amide, and diazo functional groups. Accordingly, the post-treatment activation is able to increase the amounts of nitrogen in titanium oxide layer/carbon bilayer 54. This further refines the photocatalytic oxidation of titanium oxide in visible range without requiring any UV activation sources. In another refinement, the titanium oxide/carbon bilayer is activated by visible light after treatment with a nitrogen-containg gas. In still another refinement, the activation of surface 56 results in an increase in porosity as compared to the surface prior to activation. In a further refinement, surface 56 includes regions in which there are at least 10 pores per $cm^2$ of surface area. Moreover, surface 56 includes on average at least 5 pores per $cm^2$ of surface area. The number of pores per $cm^2$ is calculated by counting the number of pores in a given area observed in a scanning electron micrograph.

The porosity of titanium oxide layer/carbon bilayer 54 is also characterized by the roughness average of surface 56. In a variation, the roughness average of surface 56 is from about 200 to about 1000 nm. In another variation, the roughness average of surface 56 is from about 300 to about 900 nm. In still another variation, the roughness average of surface 56 is from about 400 to about 700 nm.

In a variation, the carbon layer of the present invention is electrically conductive. The electrical conductivity of carbon layer 50 is such that the contact resistance of fuel cell 10 is less than about 20 mohm-$cm^2$. In a variation of an exemplary embodiment, carbon layer 50 is doped in order to increase the electrical conductivity. In one refinement, carbon layer 50 is doped. In a further refinement, the dopant is a metal. Examples of suitable metal dopants include, but are not limited to, Pt, Ir, Pd, Au, Ag, Co, Fe, Cu, Si, Ti, Zr, Al, Cr, Ni, Nb, Zr, Hb, Mo, W, and Ta. In another refinement, the dopant is a nonmetal such as nitrogen.

Figure 3:
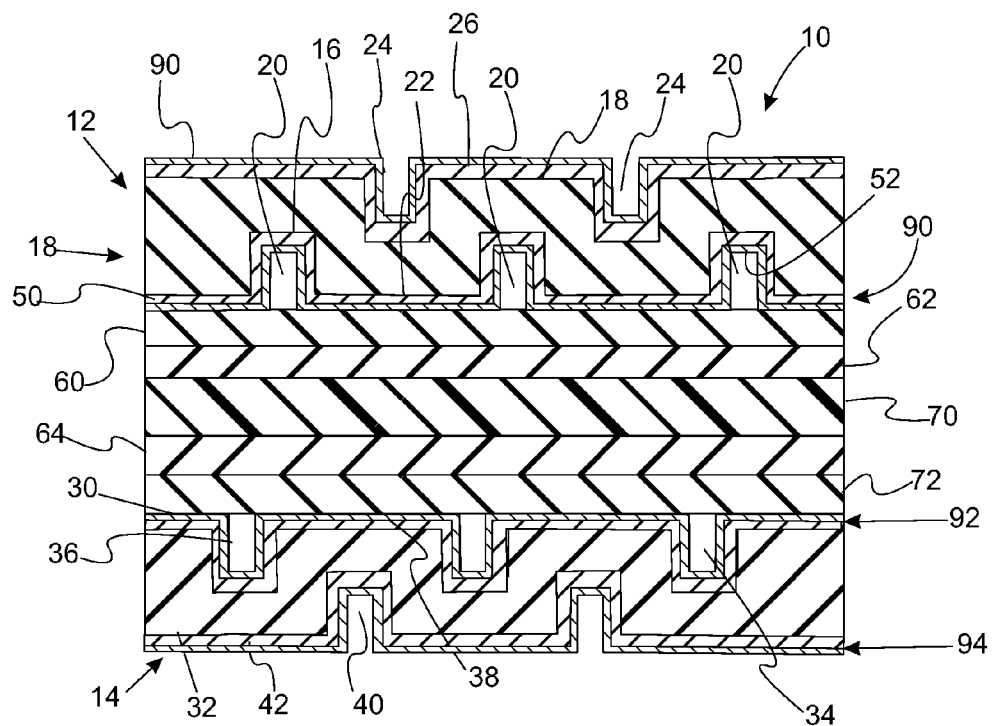
FIG. 3 provides a cross sectional view of a fuel cell incorporating another exemplary embodiment of a titanium oxide/carbon bilayer on a bipolar plate.

With reference to FIG. 3, a schematic cross section illustrating additional surfaces of fuel cell bipolar plates coated with titanium oxide/carbon bilayers is provided. In this variation, one or more of surfaces 18, 30, and 32 are coated with a carbon layer 50. As set forth above, in connection with the description of FIGS. 1A and 1B, fuel cell 10 includes flow field plates 12, 14. Bipolar plate 12 includes surface 16 and surface 18. Surface 16 defines channels 20 and lands 22. Surface 18 defines channels 24 and lands 26. Similarly, bipolar plate 14 includes surface 30 and surface 32. Surface 30 defines channels 36 and lands 38. Surface 32 defines channels 40 and lands 42.

Still referring to FIG. 3, carbon layer 50 is disposed over and contacts surface 16. Titanium oxide layer 52 is disposed over carbon layer 50 to form titanium oxide layer/carbon bilayer 54. In a variation, titanium oxide layer/carbon bilayer 54 includes surface 56 having a contact angle less than about 40 degrees. In a refinement, the contact angle is less than 20 degrees. In still another refinement, the contact angle is less than 10 degrees. Similarly, titanium oxide layer/carbon bilayer 90 is disposed over and contacts surface 18, carbon layer 92 is disposed over and contacts surface 30, and carbon layer 94 is disposed over and contacts surface 32. Fuel cell 10 further includes gas diffusion layer 60 and catalyst layers 62, 64. Polymeric ion conductive membrane 70 is interposed between catalyst layers 62, 64. Finally, fuel cell 10 also includes gas diffusion layer 72 positioned between catalyst layer 64 and bipolar plate 14. The details of titanium oxide layer/carbon bilayer 90, 92, 94 are the same as for titanium oxide layer/carbon bilayer 54 which is set forth above in connection with the description of FIGS. 1A and 1B.

Figure 4:
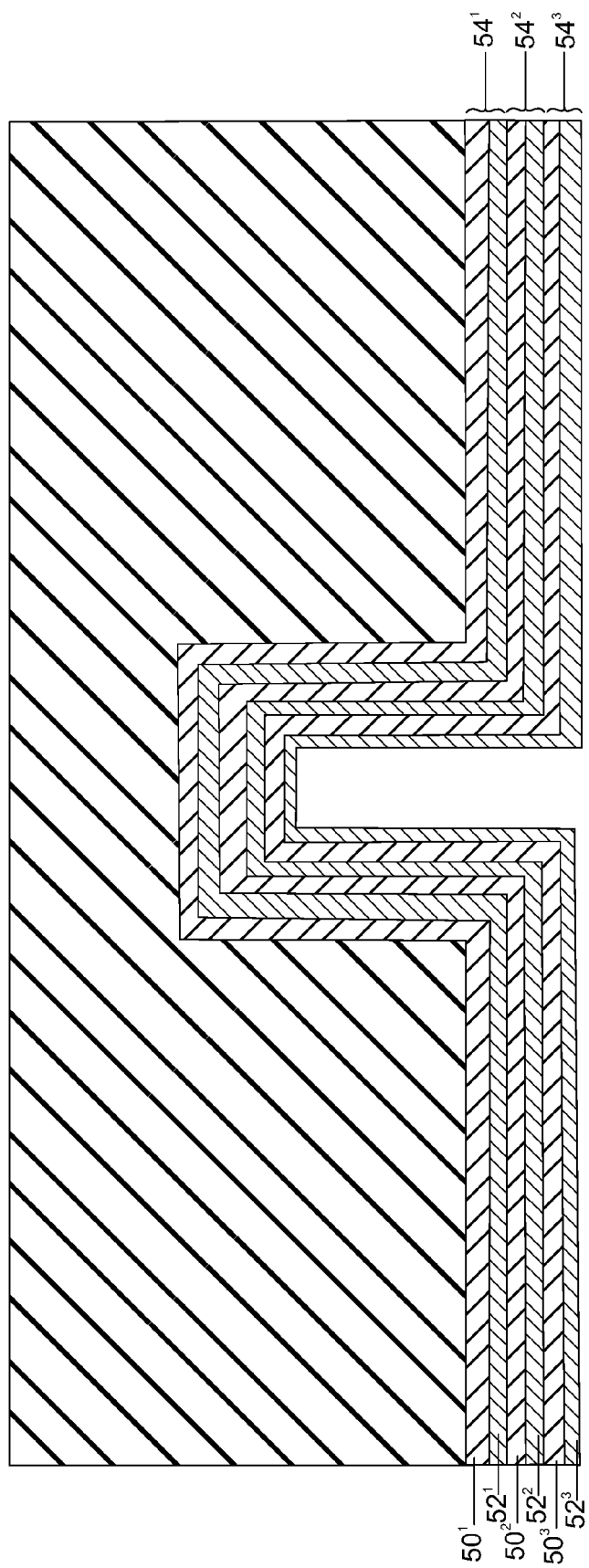
FIG. 4 provides a cross sectional view of a bipolar plate channel coated with a plurality of titanium oxide/carbon layers.

With reference to FIG. 4, a cross sectional view of a bipolar plate channel coated with a plurality of titanium oxide/carbon layers is provided. Flow field plate 12' is coated with titanium oxide/carbon bilayers $54^1$, $54^2$, $54^3$ each of which are of the design set forth above for titanium oxide/carbon layer 54. In this design, layers $50^1$, $50^2$, $50^3$ are carbon layers and $52^1$, $52^2$, $52^3$ are titanium layers. The titanium oxide/carbon bilayer furthest from the metal plate is typically activated as set forth above. Although the specific example of FIG. 4 includes three titanium oxide/carbon bilayers, it should be appreciated that this variation can include two titanium oxide/carbon bilayers. Moreover, the present variation may also include four or more titanium oxide/carbon bilayers.

As set forth above, various embodiments of the present invention include one or more titanium oxide layers. The chemical nature of the titanium nature includes various crystalline forms of titanium oxide, amorphous titanium oxide, as well as materials with chemical formula $TiO_2$ and the titanium suboxides, titanium oxide hydrate and mixtures thereof. Examples of the crystalline forms include, but are not limited to, rutile, anatase, and brookite.

Figure 5A:
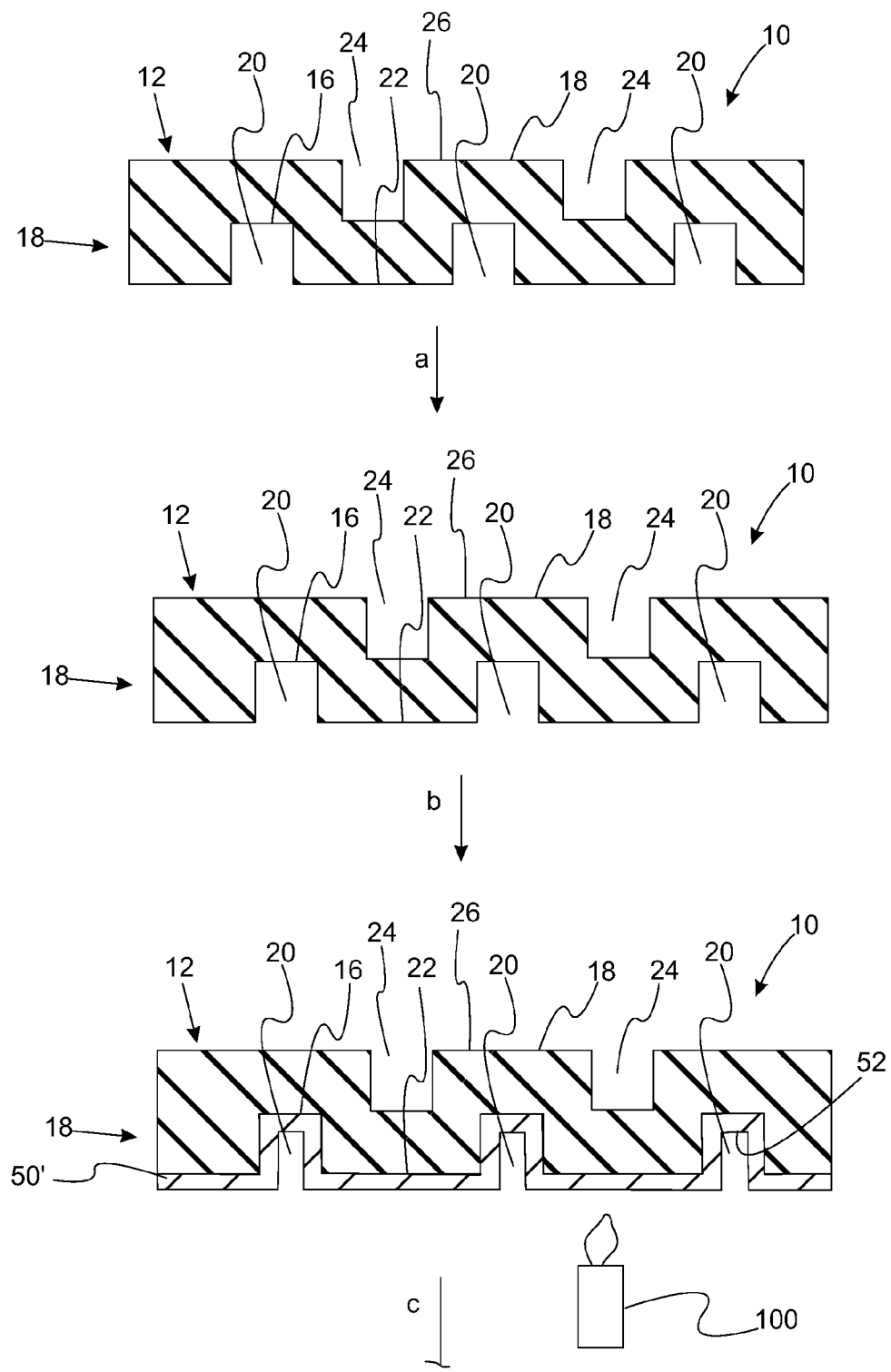
FIGS. 5A-5B provide a flowchart illustrating an exemplary method for making a bipolar plate coated with a titanium oxide/carbon bilayer.

With reference to FIG. 5, a pictorial flowchart illustrating an exemplary method of forming the flow field plates set forth above is provided. In step a), metal plate 12 is pre-conditioned prior to deposition of carbon layer 50. During such preconditioning, oxides on the surface of metal plate 12 are typically removed or at least reduced. Such pretreatment may include a cleaning step. In step b), carbon layer 50 is deposited onto metal plate 12. The carbon layer may be formed by a number of technologies known to those skilled in the art. Examples of such technologies include, but are not limited to, sputtering (e.g., magnetron, unbalanced magnetron, etc), chemical vapor deposition ("CVD") (e.g., low pressure CVD, atmospheric CVD, plasma enhanced CVD, laser assisted CVD, etc), evaporation (thermal, e-beam, arc evaporation, etc.) and the like. U.S. Pat. No. 5,314,716 discloses a CVD technique for forming non-crystalline carbon films. The entire disclosure of the patent is hereby incorporated by reference. In step c), titanium oxide layer 52 is deposited onto carbon layer 50. The titanium oxide layer may be formed by a number of technologies known to those skilled in the art. Examples of such technologies include, but are not limited to, sputtering (e.g., magnetron, unbalanced magnetron, etc), chemical vapor deposition ("CVD") (e.g., low pressure CVD, atmospheric CVD, plasma enhanced CVD, laser assisted CVD, etc), evaporation (thermal, e-beam, arc evaporation, etc.), sol-gel coating technologies, layer by layer deposition process, and the like.

Figure 5B:
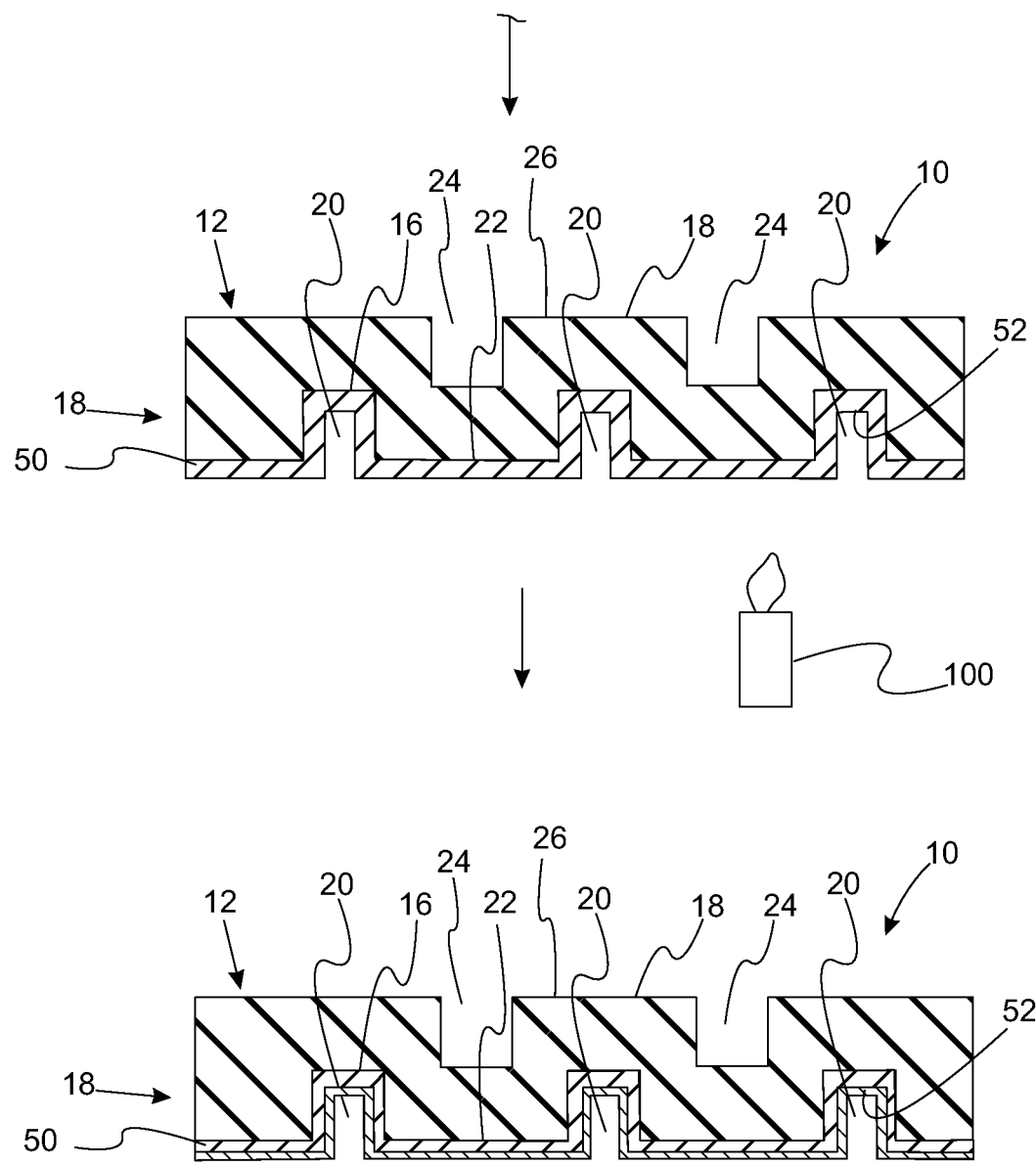

In step d), surface 56 of titanium oxide layer/carbon bilayer 54 is activated. FIG. 5B depicts UV visible or plasma activation via high density plasma 100. It should also be appreciated that additional methods of activation may be utilized. Such methods include, but are not limited to, chemical activation such as treatment (e.g., etching) of the surface with an acid such as sulfuric acid, hydrofluoric acid, chromic acid, potassium permaganate, and the like.

In a variation of the present embodiment, the carbon layers and titanium oxide layers are deposited by sputtering. In one refinement, the carbon layers are deposited using a closed field unbalanced magnetron system. For this purpose, a variation of the method and apparatus is set forth in U.S. Pat. No. 6,726,993 (the '993 patent). The entire disclosure of the '993 patent is hereby incorporated by reference in its entirety.

Figure 6:
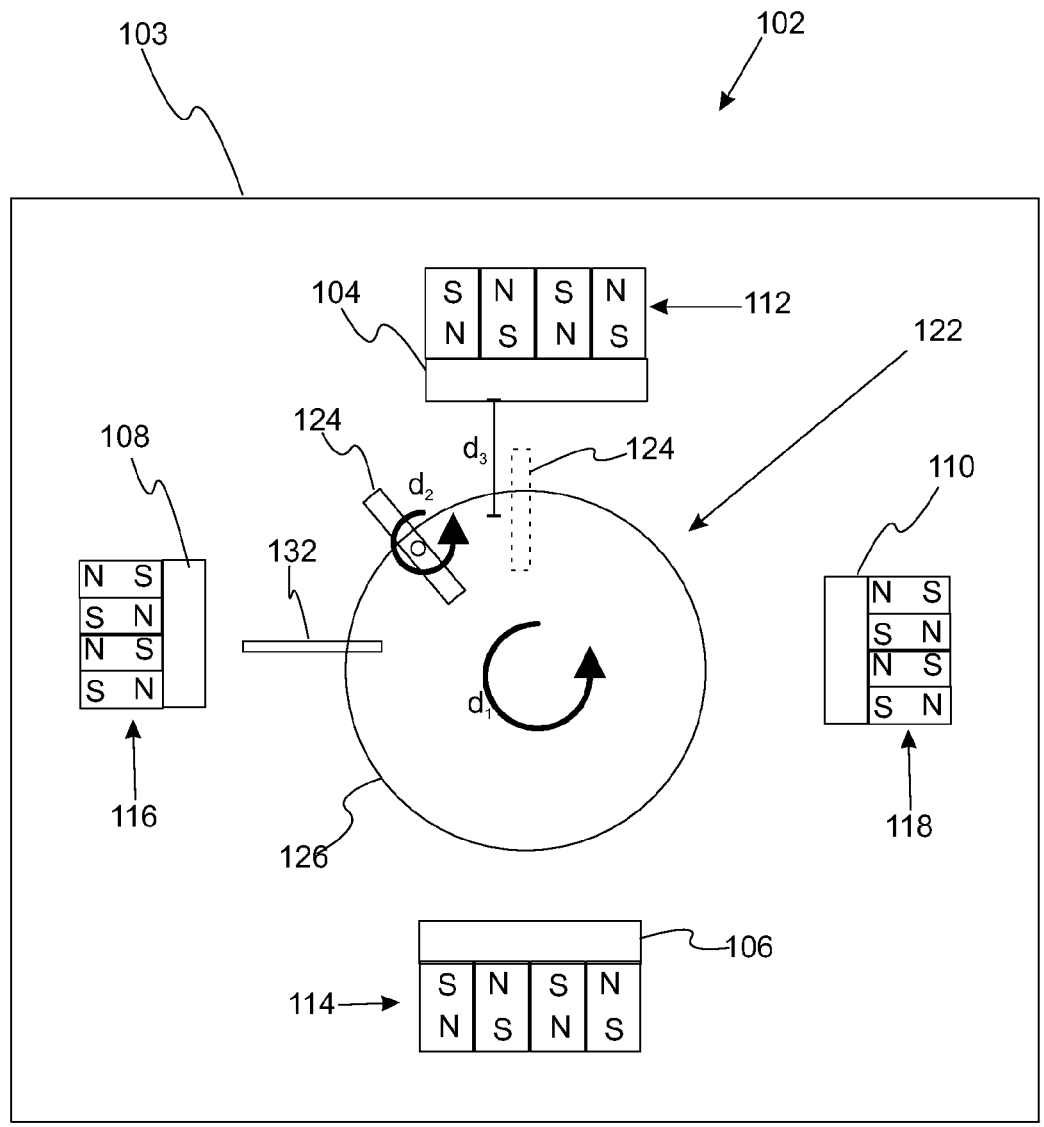
FIG. 6 is a schematic illustration of a sputtering system used to deposit carbon and titanium oxide layers.

With reference to FIG. 6, a refinement of a sputtering deposition system for depositing the carbon layers set forth above is provided. FIG. 6 provides a schematic top view of the sputtering system. Sputtering system 102 includes deposition chamber 103 and sputtering targets 104, 106, 108, 110 which are proximate to magnet sets 112, 114, 116, 118. A magnetic field generated between the targets 104, 106, 108, 110 is characterized with field lines extending between the magnetrons forming a closed field. The closed field forms a barrier which prevents the escape of electrons within plasma containing area 122. Moreover, this configuration promotes ionization in the space within the closed field with increased ion bombardment intensity. High ion current density is thereby achieved. Substrate 124 (i.e., metal plate 12) is held on platform 126 which rotates along direction $d_1$. Flipper 132 causes rotation of substrate 124 about direction $d_2$ during a cycle of platform 126. When system 102 is utilized, pre-conditioning step a) is advantageously performed by ion etching within deposition chamber 103.

In one variation of the present embodiment, graphite targets are sputtered in a chamber under the influence of a closed unbalanced magnetron field. A useful sputtering system is the Teer UDP 650 system. Graphite targets are placed on strong magnetrons that may be sputtered at a current ranging from 5 A-50 A in a closed field magnetron arrangement. The pressure in the sputter chamber may range from $1\times10^{-6}$ to $1\times10^{-4}$, a bias voltage of −400V to −20V, pulse width of 250 nanosecond to 2,000 nanosecond, and pulse DC at frequency rate of 400 KHz to 50 KHz, and argon flow rate of 200 sccm to 20 sccm for a time period of 10 minutes to 500 minutes. In one refinement, the carbon film is deposited in a thickness ranging from 5 nm to 1,000 nm. In another variation, the carbon film is deposited in a thickness ranging from 10 nm to 50 nm. The titanium oxide layer is then sputter deposited onto the carbon layer by using titanium target in the presence of an oxygen-containing gas to form the titanium oxide/carbon bilayer set forth above. Activation of the titanium oxide/carbon bilayer is advantageously performed in the same sputtering chamber after the titanium oxide layer is formed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A flow field plate for fuel cell applications comprising:
   a metal plate having a first surface and a second surface, the first surface defining a plurality of channels for directing flow of a first gaseous composition;
   a carbon layer disposed over and directly connected to at least a portion of the metal plate; and
   a titanium oxide layer disposed over and directly connected to at least a portion of the carbon layer to form a titanium oxide/carbon bilayer wherein the titanium oxide/carbon bilayer is activated by a UV or plasma source to render the titanium oxide/carbon bilayer surface clean and maintain hydrophilicity.

2. The flow field plate of claim 1 wherein the titanium oxide/carbon bilayer has a surface with a contact angle less than 40 degrees.

3. The flow field plate of claim 1 wherein the contact resistance is less than 40 mohm-cm$^2$ when the flow field plate is sandwiched between carbon papers at 200 psi.

4. The flow field plate of claim 1 wherein the titanium oxide layer is selectively deposited on a plurality of walls of the channels.

5. The flow field plate of claim 1 further comprising one or more additional titanium oxide/carbon bilayers disposed over at least a portion of the titanium oxide/carbon bilayer.

6. The flow field plate of claim 1 wherein the titanium oxide layer includes hydrocarbons in an amount that is less than 40 weight percent of the total weight of the titanium oxide layer.

7. The flow field plate of claim 1 wherein the titanium oxide layer includes hydrocarbons in an amount that is less than 20 weight percent of the total weight of the titanium oxide layer.

8. The flow field plate of claim 1 wherein the carbon layer comprises amorphous carbon.

9. The flow field plate of claim 8 wherein the carbon layer has a surface including on average at least 5 pores per $cm^2$.

10. The flow field plate of claim 1 wherein the titanium oxide layer comprises a component selected from the group consisting of $TiO_2$, titanium suboxides, titanium oxide hydrate and mixtures thereof.

11. The flow field plate of claim 1 wherein the titanium oxide layer comprises an amphorous titanium oxide or a polycrystalline titanium oxide.

12. The flow field plate of claim 1 wherein the metal plate has a second surface defining a second plurality of channels for directing flow of a second gaseous composition.

13. The flow field plate of claim 12 wherein the second surface is a second non-crystalline carbon layer.

14. A flow field plate for fuel cell applications comprising:
a metal plate having a first surface and a second surface, the first surface defining a plurality of channels for directing flow of a first gaseous composition;
a carbon layer disposed over and directly connected to at least a portion of the metal plate; and
a titanium oxide layer disposed over and directly connected to at least a portion of the carbon layer to form a titanium oxide/carbon bilayer wherein the titanium oxide/carbon bilayer is activated by visible light after treatment with a nitrogen-containing gas.

\* \* \* \* \*